(12) United States Patent
Jeon

(10) Patent No.: US 9,103,322 B2
(45) Date of Patent: Aug. 11, 2015

(54) INDEPENDENT POWER GENERATOR ASSEMBLY AND POWER GENERATOR SYSTEM USING SAME

(75) Inventor: Byung-Ok Jeon, Gimhae-si (KR)

(73) Assignee: SILVERAY CO., LTD., Gimhae-Si, Gyeongsangnam-Do (KR)

( * ) Notice: Subject to any disclaimer, the term of this patent is extended or adjusted under 35 U.S.C. 154(b) by 33 days.

(21) Appl. No.: 14/349,968

(22) PCT Filed: Jul. 2, 2012

(86) PCT No.: PCT/KR2012/005220
§ 371 (c)(1),
(2), (4) Date: Apr. 4, 2014

(87) PCT Pub. No.: WO2013/005955
PCT Pub. Date: Jan. 10, 2013

(65) Prior Publication Data
US 2014/0246861 A1    Sep. 4, 2014

(30) Foreign Application Priority Data

Jul. 5, 2011    (KR) .......................... 10-2011-0066835

(51) Int. Cl.
*F02B 63/04*    (2006.01)
*F03G 7/08*    (2006.01)
(Continued)

(52) U.S. Cl.
CPC ................ *F03D 9/002* (2013.01); *F03B 13/00* (2013.01); *H02K 16/00* (2013.01); *H02K 53/00* (2013.01)

(58) Field of Classification Search
USPC .......................................... 290/1 R; 310/112
See application file for complete search history.

(56) References Cited

U.S. PATENT DOCUMENTS 4,874,916 A * 10/1989 Burke ............................ 219/671
5,808,280 A * 9/1998 Gaspard ........................ 219/624
(Continued)

FOREIGN PATENT DOCUMENTS

JP     2003-102164      4/2003
KR    10-2004-0047551   6/2004
(Continued)

OTHER PUBLICATIONS

International Search Report for International Application No. PCT/KR2012/005220, dated Dec. 27, 2012.
(Continued)

*Primary Examiner* — Pedro J Cuevas
(74) *Attorney, Agent, or Firm* — Kile Park Reed & Houtteman PLLC

(57) ABSTRACT

Disclosed herein is an independent power generator assembly comprising a driving magnetic member in which N pole and S pole are arranged alternately; a first power generation module including an induction coil, and plural power supply generating members having isolation spaces with the driving magnetic member as the center, and arranged and constructed along the circumference of the driving magnetic member, the power supply generating member having a magnet vibrator; and a second power generation module in which induction coils are arranged along the isolation spaces; wherein the first power generation module and the second power generation module are repeatedly arranged with an annular ring shape: another first power generation module is arranged at the circumference of the second power generation module and another second power generation module is arranged at the circumference of such an another first power generation module.

17 Claims, 11 Drawing Sheets

(51) Int. Cl.
  *H02K 7/18*   (2006.01)
  *F03D 9/00*   (2006.01)
  *H02K 53/00*  (2006.01)
  *H02K 16/00*  (2006.01)
  *F03B 13/00*  (2006.01)
  *H02K 7/20*   (2006.01)

(56) References Cited

U.S. PATENT DOCUMENTS

| | | | | |
|---|---|---|---|---|
| 6,472,794 | B1* | 10/2002 | Shibaike et al. | 310/309 |
| 6,531,799 | B1* | 3/2003 | Miller | 310/114 |
| 7,023,312 | B1* | 4/2006 | Lanoue et al. | 336/60 |
| 7,081,696 | B2* | 7/2006 | Ritchey | 310/114 |
| 7,595,574 | B2* | 9/2009 | Ritchey | 310/112 |
| 7,647,692 | B2* | 1/2010 | Lanoue et al. | 29/609 |
| 7,965,589 | B2* | 6/2011 | Hipwell et al. | 369/43 |
| 8,106,563 | B2* | 1/2012 | Ritchey | 310/268 |
| 8,212,445 | B2* | 7/2012 | Ritchey | 310/112 |
| 8,614,529 | B2* | 12/2013 | Ritchey | 310/78 |
| 2004/0021437 | A1* | 2/2004 | Maslov et al. | 318/254 |
| 2005/0184689 | A1* | 8/2005 | Maslov et al. | 318/254 |
| 2006/0033392 | A1* | 2/2006 | Ritchey | 310/112 |
| 2006/0033393 | A1* | 2/2006 | Ritchey | 310/112 |
| 2008/0088200 | A1* | 4/2008 | Ritchey | 310/268 |
| 2008/0174899 | A1* | 7/2008 | Hipwell et al. | 360/71 |
| 2008/0185927 | A1* | 8/2008 | Ritchey | 310/78 |
| 2010/0019593 | A1* | 1/2010 | Ritchey | 310/112 |
| 2010/0090553 | A1* | 4/2010 | Ritchey | 310/114 |
| 2012/0153757 | A1* | 6/2012 | Ritchey | 310/114 |
| 2013/0249502 | A1* | 9/2013 | Ritchey | 322/94 |
| 2014/0167708 | A1* | 6/2014 | Ritchey | 322/90 |

FOREIGN PATENT DOCUMENTS

| | | |
|---|---|---|
| KR | 10-1020104 | 3/2011 |
| KR | 10-2011-0053879 | 5/2011 |

OTHER PUBLICATIONS

PCT Written Opinion for International Application No. PCT/KR2012/005220, dated Dec. 27, 2012.

* cited by examiner

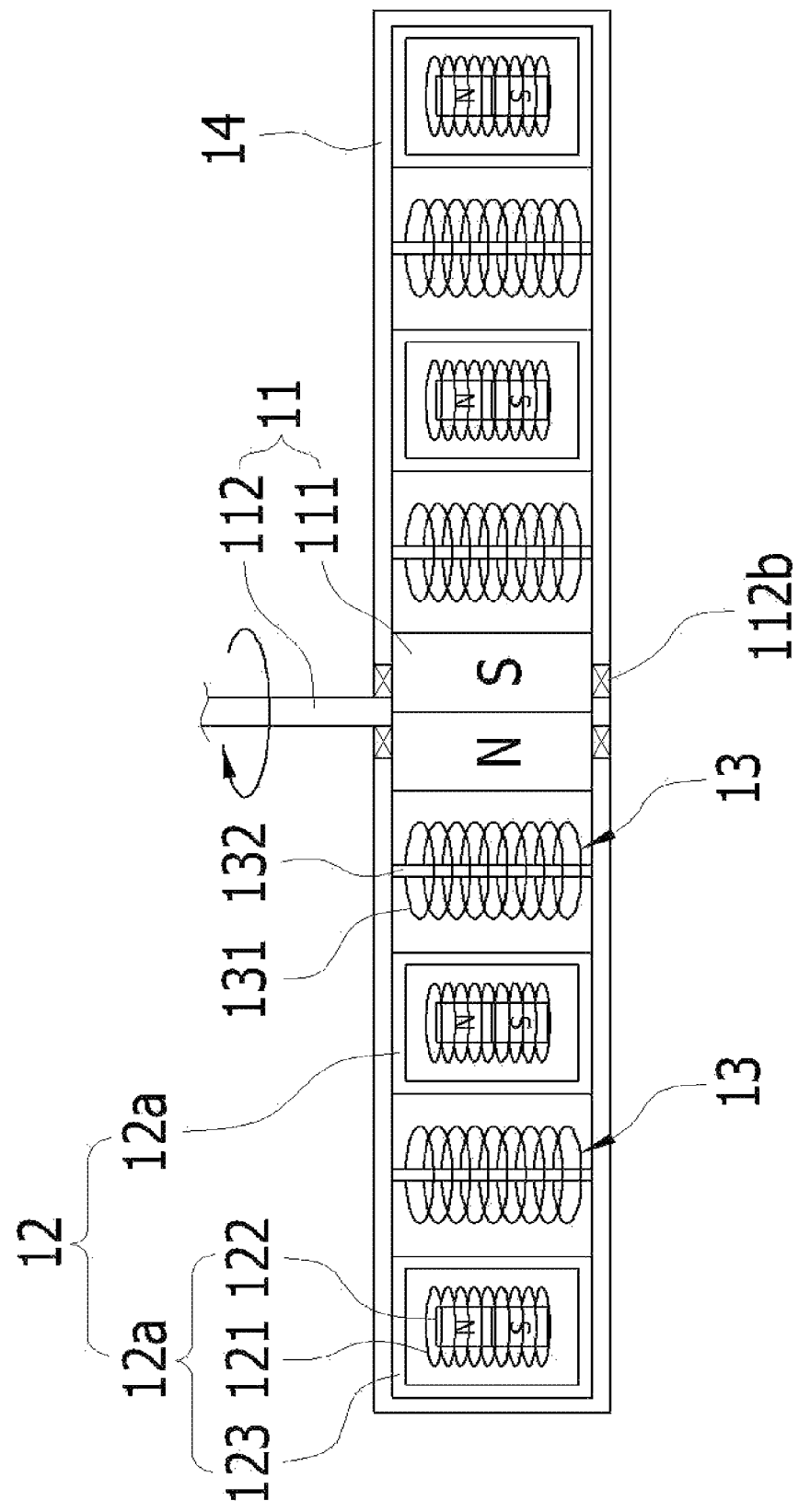

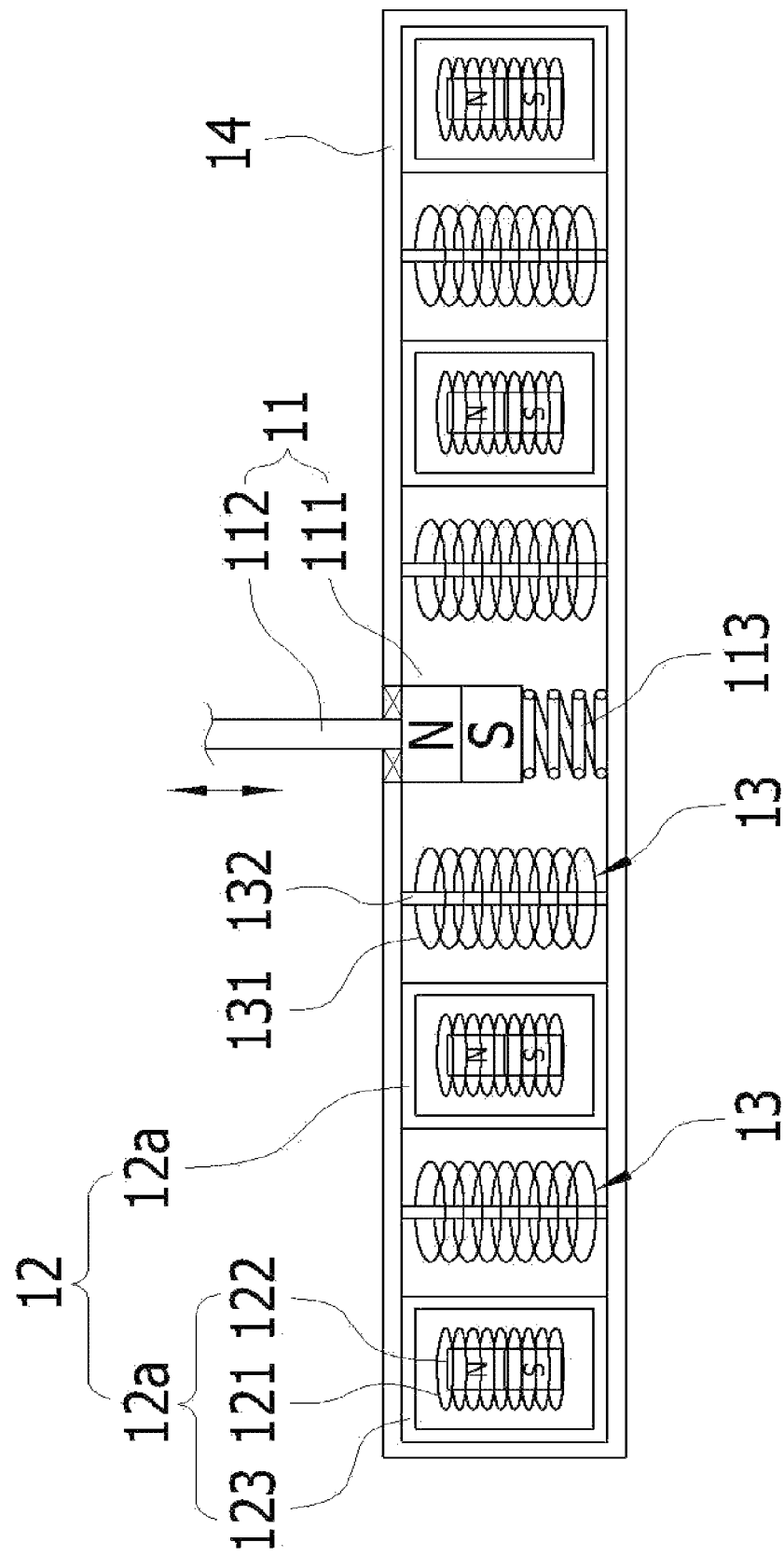

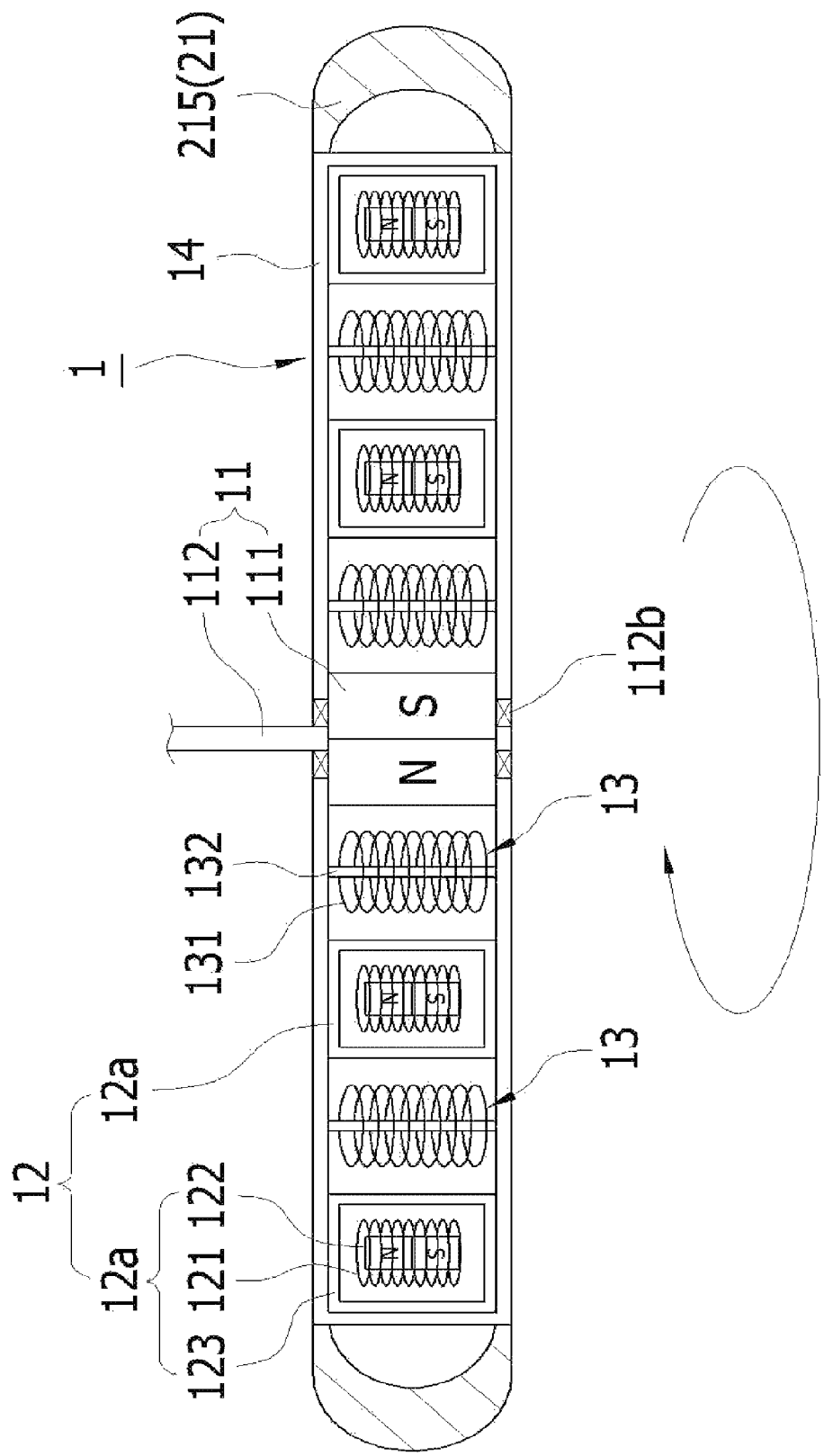

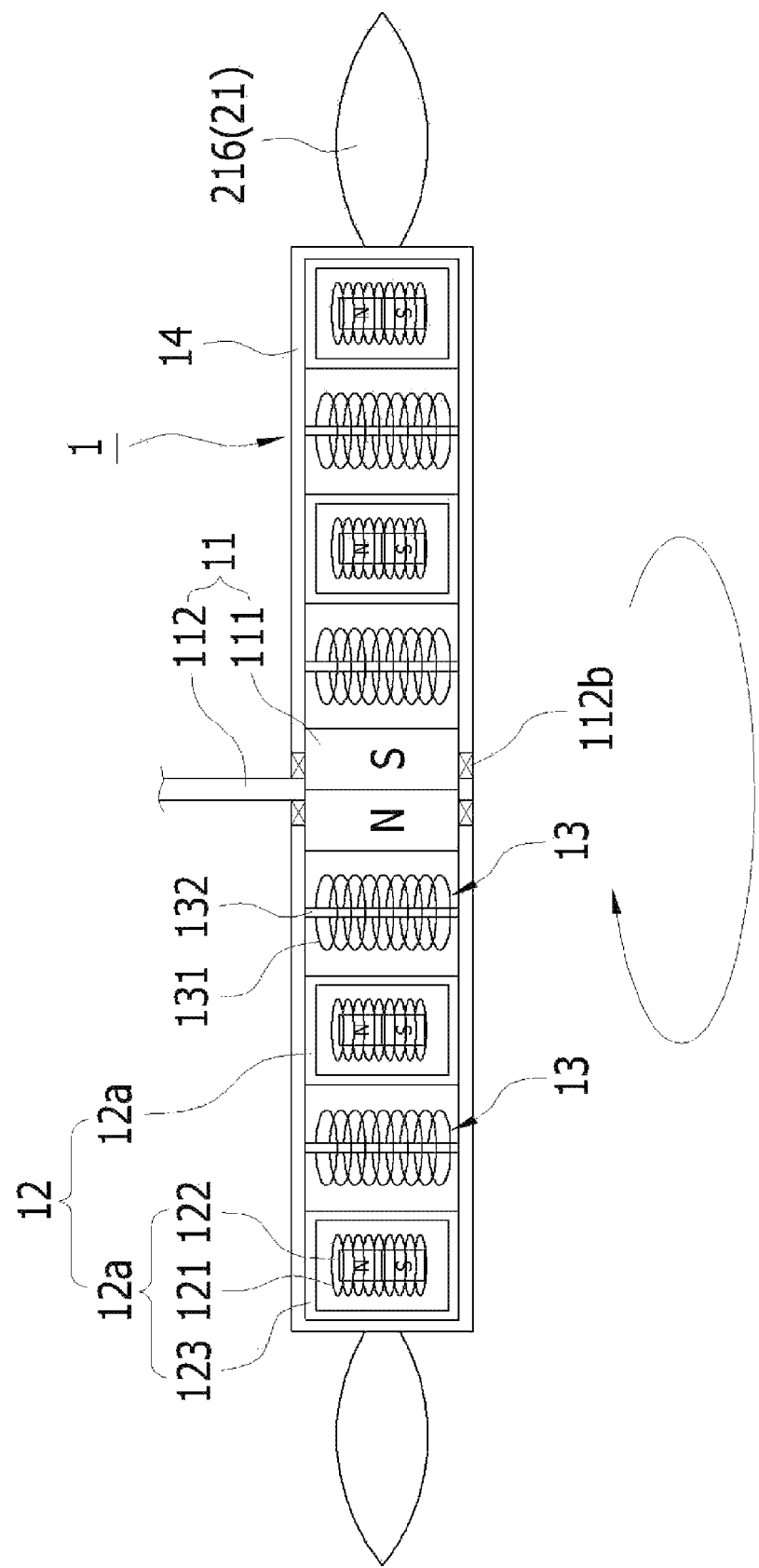

INDEPENDENT POWER GENERATOR ASSEMBLY AND POWER GENERATOR SYSTEM USING SAME

BACKGROUND OF THE INVENTION

1. Field of the Invention

The present invention relates to an independent power generator assembly and a power generator system using same, more particularly, to an independent power generator assembly and a power generating system using the same which have a compact and simple construction, and are constructed to increase the number of devices to be arranged for generating electricity within a limited space, thereby maximizing the amount of generating electricity.

2. Description of Related Art

Although electricity is used as main energy source in the industrial society, in recent years, due to the depletion of fossil energy, investment and development have been progressed rapidly to various alternative power plants such as solar-light power generation, wind power generation, tidal power generation and so on.

The electricity produced from power plants has been provided to household and industrial devices and products in which comparatively large use electricity is required by medium of a power cable and used as energy source, however, most of products, in which the portability or activity is required, such as a small scale of household products or items, have a primary cell or a secondary cell such as a lithium-ion battery and use them as electric power source.

The battery has the limited use time, so if power is discharged, the battery must be charged to use. However, when a user is moving or at the outside, the battery cannot be charged. That is, when discharging the battery, the corresponding product cannot be used. To solve this problem, various independent power generating devices recently are developed and can be used by charging necessary power in emergency.

According this, the present applicant, as shown in FIG. 1, had invented an independent power generator having a generation body 1, at least one or more power generating member 2 installed at the generation body 1, and a driving magnetic member 3 for driving the power generating member 2 to be produced electricity and filed as Korean Patent Application No. 10-2009-011192.

The power generating member 2 comprises a case 21 having a wound induction coil 22 in which electromotive force is produced by electromagnetic induction and a receiving space 211 at the inside thereof, and a vibrator 23 with a changed magnetic pole, rocked by magnetic force applied from the outside. Especially, the power generating member 2 comprises a non-shaft type of vibrator 23 which includes a magnetic in which N and S poles are formed, has no a separate output shaft, as a part that performs a similar role against a rotator in a conventional power plant.

In such a type of power generating member 2, a private generating device with a sufficient shock resistance and durability could be implemented because of a permanent magnetic having a simple and compact structure and with excellent rigidness against external force such as shock.

In the foresaid conventional private generating device, the vibrator 23 of the power generating member 2 is rocked according to an up-and-down motion of a driving magnetic member 3 and then its poles are changed, so electromotive force is produced to the induction coil by electromagnetic induction, thereby generating power. However, there is a problem that its changing efficiency of down and up forces of the driving magnetic member 3 into electric energy is very low.

More specifically explained, when going down the driving magnetic member 3, alternatively arranged N and S poles apply a magnetic force to the vibrator, so the vibrator is rocked and N and S poles are changed, thereby generating power. Although the rock of the vibrator is increased or decreased according to the stroke and moving speed of the driving magnetic member, there is a limit that the up and down forces all of the driving magnetic member cannot be produced into electric energy. That is, when different forces such as 5 kgf, 20 kgf, and 100 kgf and so on are applied to the driving magnetic member, it has different pressure forces and moving speeds, whereas when the stroke of the driving magnetic member in the private generating device is fixed, it is moved with the same moving speed, so the electric energy generated by the power generating member is shown as a similar result.

To solve the above problem, a large number of power generating members are arranged on the periphery of the driving magnetic member and then the force applied to it can be used to generate power. That is, power generation is performed by making the first vibrator embedded within the first power generating member rocked by the driving magnetic member and then continuously performed by making the second vibrator of the second power generating member arranged adjacently to the first vibrator rocked. According to this method, in a great number of power generating members, vibrators are rocked by a method similar to the domino effect, thereby generating power. However, in this method, the interaction by magnetic power is possible only when the interval between vibrators of the respective power generating members is maintained constantly. So, there is a disadvantage that the arrangement distance between the power generating member become wide and the arrangement number of the power generating member per unit space or unit area is limited, so the power generating amount is also limited. And, in the private generating device, the interval between a great number of power generating members is spaced at the center of the driving magnetic member and so the volume of the private generating device become large excessively and a compact and simple private generating device cannot be constructed. Therefore, there is a problem in installation and application of such a private generating device and the installation and manufacturing cost can be increased.

SUMMARY OF THE INVENTION

Disclosure

Technical Problem

The present invention has been made in an effort to solve the above-described problems associated with prior art, and an object of the present invention is to provide an independent power generator assembly and a power generating system using the same which have a compact and simple construction, and are constructed to increase the number of devices to be arranged for performing power generation within a limited space, thereby maximizing the electric power generation.

Technical Solution

In a first aspect, the present invention provides an independent power generator assembly comprising: a driving magnetic member in which N pole and S pole are arranged alternately and at the center thereof; a first power generation module including an induction coil in which electromotive force is produced by electromagnetic induction, and plural power supply generating members having isolation spaces with the driving magnetic member as the center, and arranged and constructed along the circumference of the driving magnetic member, the power supply generating member having a magnet vibrator in which it is rocked by the applied magnetic force and its magnetic poles are changed; and a second power generation module arranged along the isolation spaces and having induction coils; wherein the first power generation module and the second power generation module are repeatedly arranged with an annular ring shape: another first power generation module is arranged at the circumference of the second power generation module and another second power generation module is arranged at the circumference of such an another first power generation module.

In a second aspect, the present invention provides a power generating system using an independent power generator assembly comprising: an independent power generator assembly as previously described; and an external force providing member constructed for providing a rotation force for performing a rotation motion or a translational force for performing a translation motion to the driving shaft.

In a third aspect, the present invention provides an independent power generator assembly comprising: an independent power generator assembly as previously described; and an external force providing member is constructed at the circumference for providing a rotation force, so that the first and second power generation modules are rotated with the driving magnetic member as a standard.

Advantageous Effects

According to the independent power generator assembly and power generating system using the same as described above, the independent power generator assembly comprises the first power generation modules arranged isolatedly with a driving magnetic member as the center to generate electricity, and the second power generation module arranged to the meaninglessly neglected isolation spaces for maintaining the distance between the first power generation module and the driving magnetic member, thereby capable of generating electricity. Also, the first and second power generation modules are repeatedly arranged by an annular ring shape, thereby capable of implementing an independent power generator assembly with a compact and simple structure and with very high efficiency when transforming the motion of the driving magnetic member into electricity. And, since the independent power generator assemblies have a disc type and are arranged by multi-layer and multi-row within the limited space, they are easy to handle and use and so on, and their structure is simple and compact, so that the wind power generating system and water power generation system with high power generation efficiency and a simple and compact structure can be implemented effectively.

BRIEF DESCRIPTION OF THE DRAWINGS

The above and other features of the present invention will be described with reference to certain exemplary embodiments thereof illustrated the attached drawings in which:

FIGS. 2a and 2b are cross-sectional views showing technical ideas according to an independent power generator assembly of the present invention.

FIGS. 9 and 10 are construction views showing power generating systems using the independent power generator assemblies according to the fourth and fifth embodiments of the present invention.

DETAILED DESCRIPTION OF THE INVENTION

Figure 1:
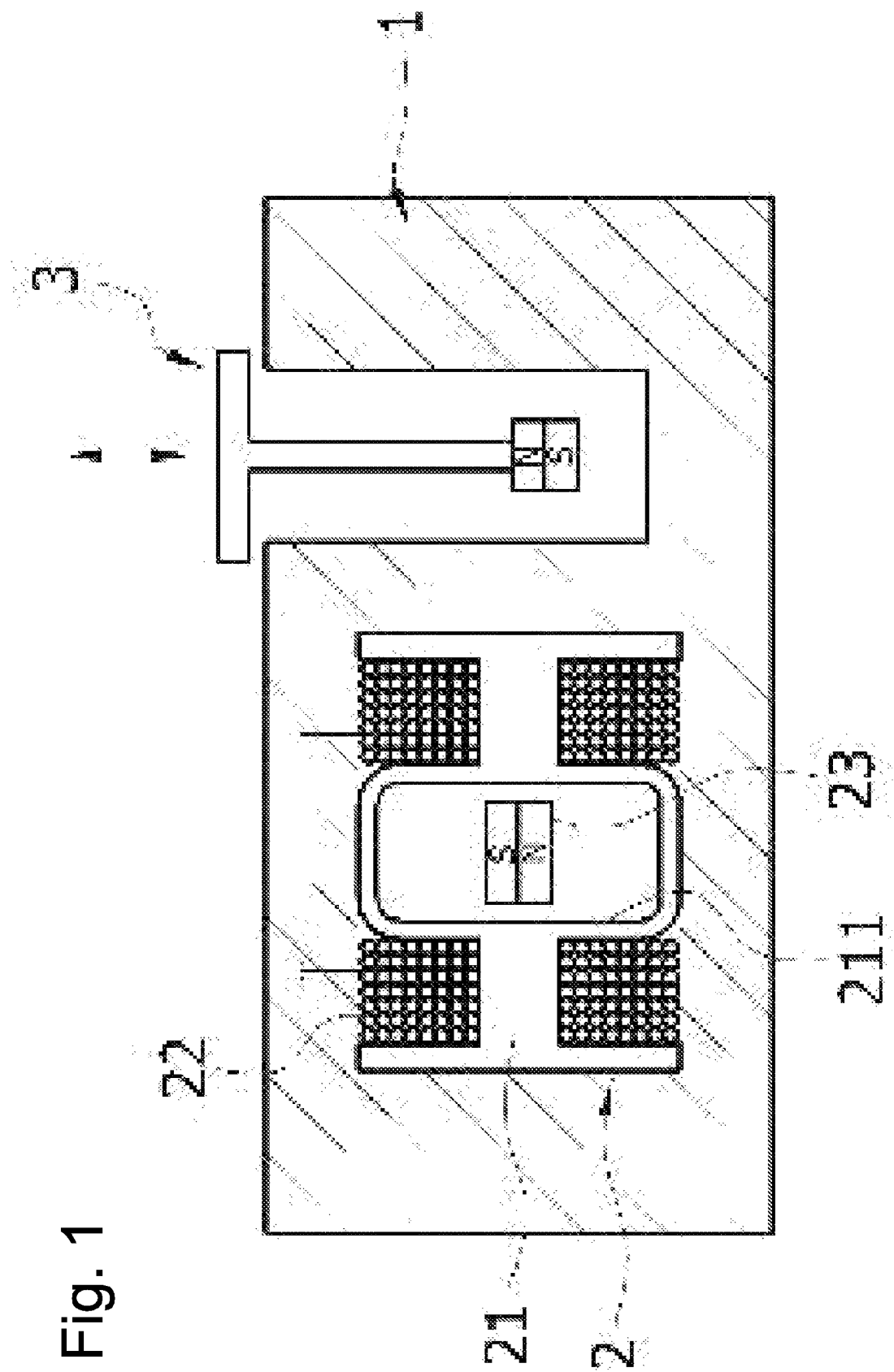
FIG. 1 is a schematic diagram showing a conventional private generating device.

Hereinafter, preferred embodiments in accordance with the present invention will be described with reference to the accompanying drawings of FIGS. 2a to 10. In FIGS. 2a to 10, the same elements are depicted as the same reference numbers. The preferred embodiments are provided so that those skilled in the art can sufficiently understand the present invention, but can be modified in various forms and the scope of the present invention is not limited to the preferred embodiments. In FIGS. 2a to 10, the construction, its effect and explanation which can be known easily to the skilled person are omitted or depicted in simple and then the parts related to the present invention are depicted in priority.

The accompanying drawings, FIGS. 2a and 2b are cross-sectional views showing technical ideas according to an independent power generator assembly of the present invention.

As shown in FIGS. 2a and 2b, an independent power generator assembly 1 comprises a first power generation module 12 including plural power supply generating members 12a having a driving magnetic member 11, an induction coil 121 and a magnetic vibrator 122, and a second power generation module 13 arranged on the circumference of the first power generation module 12 and having an induction coil 13. The first power generation modules 12 and the second power generation module 13 are arranged and constructed repeatedly with an annual ring shape.

The driving magnetic member 11 is arranged at the center of the independent power generator assembly 1 and has N and S poles alternately arranged. As shown in FIG. 2a, N and S poles may be formed alternately toward the circumferential direction or, as shown in FIG. 2b, up-and-down direction. And, as shown in FIG. 2b, in case that N and S poles are arranged toward the up-and-down direction, it is desirable that the a return member 113 such as an elastic member is equipped to be returned the driving magnetic member 11 after it is dropped by the pressurizing force.

The first power generation module 12 has isolation spaces at the center of the driving magnetic member 11 and plural power supply generating members 12a are arranged and constructed along its circumference, and since its radius become large increasingly toward the outside, the number of the arranged power supply generating member 12a is gradually increased. At this time, the isolation space formed between the driving magnetic members 11 and the first power generation module 12 is defined according to the magnetic power (the size of gauss) of N and S poles formed at the driving magnetic member 11. The isolation space has an isolation distance as follows: N and S poles formed at the driving magnetic member 11 and N and S poles formed at the magnetic vibrator 122 are not moved by the attraction force, the magnetic pole of the magnetic vibrator 122 is changed most actively against the motion of the driving magnetic member 11 within the scope that they are not fixed with each other and the rocking force become large most.

And, in the power supply generating member 12a, if its structure is possible to generate power effectively when rocking the driving magnetic member 11, there is no limitation in its type or structure. However, it comprises a barrel-shaped body having a hollow portion formed at the inside thereof, an induction coil 121 wound to the body and having electromotive force generated by the electromagnetic induction, and a magnetic vibrator 122 installed at the inside thereof in which it is rocked by the magnetic force applied from the outside and then its magnetic pole is changed.

The second power generation module 13 is formed by winding the induction coil 131 toward the circumferential direction or toward the direction that meets at right angles against the circumferential direction. The induction coil 13, as described hereinafter the concrete embodiment, is wound to the circumference of the winding housing 132.

Here, what the first power generation module 12 and the second power generation module 13 are repeatedly arranged with an annular ring shape means that another first power generation module 12 is arranged at the circumference of the second power generation module 13 and another second power generation module 13 is arranged at the circumference of such an another first power generation module 12 and in such a manner, the first and second power generation modules are arranged repeatedly.

And, the induction coils 121 and 123 equipped with the first and second power generation modules 12 and 13, although they are not specifically shown, are connected electrically in series or in parallel and connected with a charging member for charging the generated power supply or the power supply members.

Figure 3:
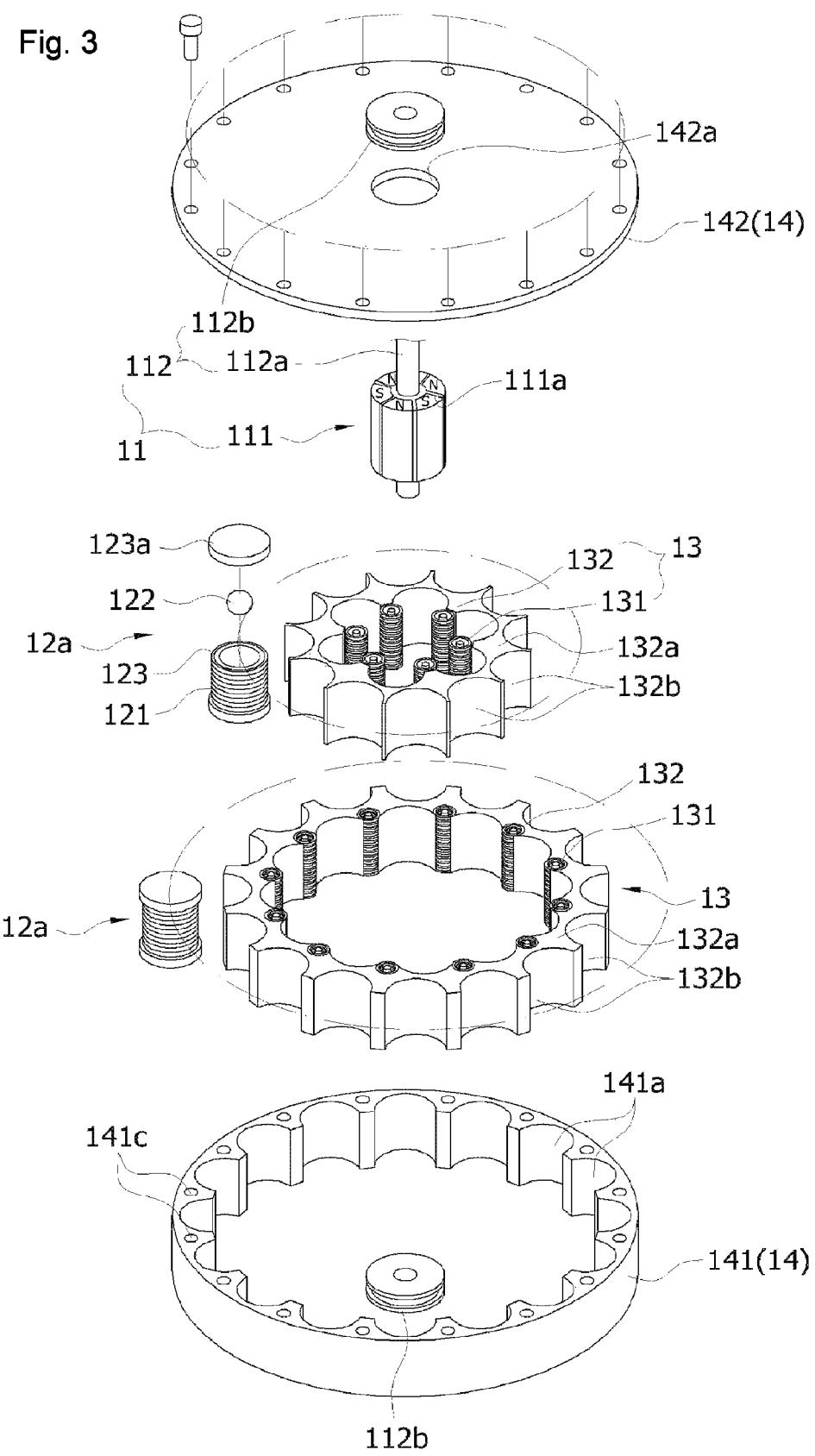
FIG. 3 is an exploded perspective view of the power generator assembly according to the first embodiment of the present invention.

FIG. 3 is an exploded perspective view of the power generator assembly according to the first embodiment of the present invention.

As shown in FIG. 3, the independent power generator assembly 1 comprises a driving magnetic member 11, and first power generating module 12 and second power generating module 13 arranged repeatedly with an annular ring shape, wherein the independent power generator assembly is received to the inside of a separate case 14 to seal the upper and lower portions of the first power generating module 12 and the second power generating module 13.

The driving magnetic member 11 comprises a permanent magnet coupling member 111 having N poles and S poles repeatedly arranged toward the circumferential direction, and a driving member 112 with which the permanent magnet coupling member 111 is coupled and for performing a rotation motion by driving force applied from the outside.

The driving member 112 comprises a driving shaft 112a formed by a rod type structure and installed rotatably. The driving shaft 112a is supported rotatably by a support bearing 112b or the busing such as an oil-less bushing.

The permanent magnet coupling member 111 comprises a magnet housing 111a in which plural concave coupling grooves are formed along to the circumferential direction, and N poles and S poles alternately installed at the coupling grooves of the magnet housing 111a.

In the power supply generating member 12a constructing the first power generation module 12, a body 123 is formed by a cylindrical shape and an induction coil 121 is wound to the outer circumferential surface or the inner circumferential surface or a bobbin with the wound induction coil 121 is installed to the outer circumferential surface or the inner circumferential surface. At this time, it is desirable that a separable cover 123a is equipped with the body 123 so that the installation and maintenance are possible. The induction coil 121 is located, manufactured and installed within a protection film (not shown) or a protection cover (not shown) in order not to be damaged when rocking the magnet vibrator 122. And, in case that the induction coil 121 is wound to the outer circumferential surface of the body 123, it is desirable that a concave induction coil winding groove (not shown) is formed on the outer circumferential surface of the body 123 and a protection layer (not shown) is formed at the outer surface of the induction coil 121.

The magnet vibrator 122 is formed by a ball-shape or disc-shape permanent magnet having N pole and S pole and installed to the inside of the receiving space of the body 123.

The second power generation module 13 includes a winding housing 132 with the wound induction coil 131. There is no limitation in the shape of the winding housing 132, if it can wind the induction coil and maintain the determined isolation distance of the driving magnetic member 11 and power supply generating member 12a, as shown in FIG. 3, however, it is roughly formed by a circle shape or ring shape and then embedded to the case 14. Plural seating grooves 132b having a circular arc shape are formed along the outer circumference to safely insert and fix the body 123 to a housing body, and induction coils 132 are wound along the inner circumference. And a coil winding protrusion can be formed to the winding housing 132 to wind up the induction coil effectively.

On the other hand, in the case 14, if it can embed a driving magnetic member 11, plural first power generation modules 121 and second power generation modules 13 easily, there is no limitation in its structure and type. In this embodiment, as shown in FIG. 3, it comprises a lower case 141 and an upper case 142.

The lower case 141 includes an opened upper portion and is formed by a cylindrical shape in which its diameter is large compared to height and has a receiving space to the inside thereof. Plural seating grooves 141a having a circular arc shape are formed at the circumference of the lower case to settle down the power supply generating member 12a. Also, coupling holes 141c are formed at the lower case 141 and coupled with a coupling member such as a bolt to couple it with the upper case 142.

The upper case 142 is a member coupled with an upper surface of the lower case 141 and its body is formed roughly by a disc shape and a bearing hole 142a is formed at the center of the body. A support bearing 112b is inserted into the bearing hole 142a to support a driving shaft.

Hereinafter, an operation of the independent power generator assembly according to the first embodiment of the present invention will be described in simple.

A driving shaft 112a of the driving magnetic member 11 is inserted into a central support bearing 112b of the lower case 141, and a winding housing 132 winding an induction coil 131 is inserted into and contacted with the driving magnetic member 11, thereby assembling a line of the second power generation module 13.

Plural power supply generating members 12a are prepared by the manner that a magnet vibrator 122 is inserted into the body 123 and then an induction coil 121 is wound, and then they are successively inserted into and installed to plural seating grooves 132b equipped to the winding housing 132. In this manner, a line of the first power generation module 12 is assembled.

Thereafter, a winding housing 132 winding an induction coil 131 is inserted and installed to the lower case 141, which is corresponded with the circumference of the first power generation module 12, thereby assembling two lines of the second power generation module 13. Again, power supply generating members 12a are successively inserted into and inserted to the circumference of the second power generation module 13, thereby assembling two lines of the first power generation module 12. At this time, in case that more lines of the first and second power generation modules are arranged, they are assembled and constructed by the same method.

When the assembling of the first and second power generation modules 12 and 13 is finished, and the upper surface of the lower case 141 is covered with the upper case 142 and then a tightening work is performed, the assembling of the independent power generator assembly is completed.

As described above, when a rotation device, which will be described hereinafter, is coupled with the driving shaft 112a of the assembled independent power generator assembly and so a power generation system is constructed, the electricity can be produced by using natural energy such as wind power or water power.

Such a process will be described as follows more specifically: when a rotation shaft of a rotation device is rotated, a driving shaft 12a coupled with it is rotated and so when N magnetic pole and S magnetic pole of a permanent magnet coupling member 111 are changed, the electromotive force is generated at the induction coil 131 of the second power generation module 13 by electromagnetic induction and the power generation operation is performed firstly to a line of the second power generation module 13 adjacent to the driving magnetic member 11. Simultaneously, according to the change of N magnetic pole and S magnetic pole of the permanent magnet coupling member 111, when magnet vibrators 122 of the power supply generating member 12a are rocked, the electromotive force is produced at the induction coil 121 wound to the body 123 because of the change of magnetic pole, the power generation operation is performed secondly to a line of the first power generation module 12

And, when magnet vibrators 122 located within the respective power supply generating members 12a for constructing a line of the first power generation module 12 are rocked and then their magnetic poles are changed, the electromotive force is produced at the induction coil 131 of the second row of the second power generation module 13 contacting with the magnetic poles, so the power generation operation is performed thirdly.

Simultaneously, magnet vibrators 122 located within the respective power supply generating members 12a for constructing the second row of the first power generation module 12 contacted with the second row of the second power generation module 13 are rocked, the power generation operation is performed fourthly.

On the other hand, according to the previously described power generation method, since the electricity can be generated by multiple-manner to the rotation of the driving magnetic member 11, which is similar to the domino effect, when the rotation force of the driving magnetic member 11 is large, it can be changed into the electric energy without dissipation of the rotation force, so that the power generation system with high efficiency can be implemented.

MODE OF INVENTION

Figure 4:
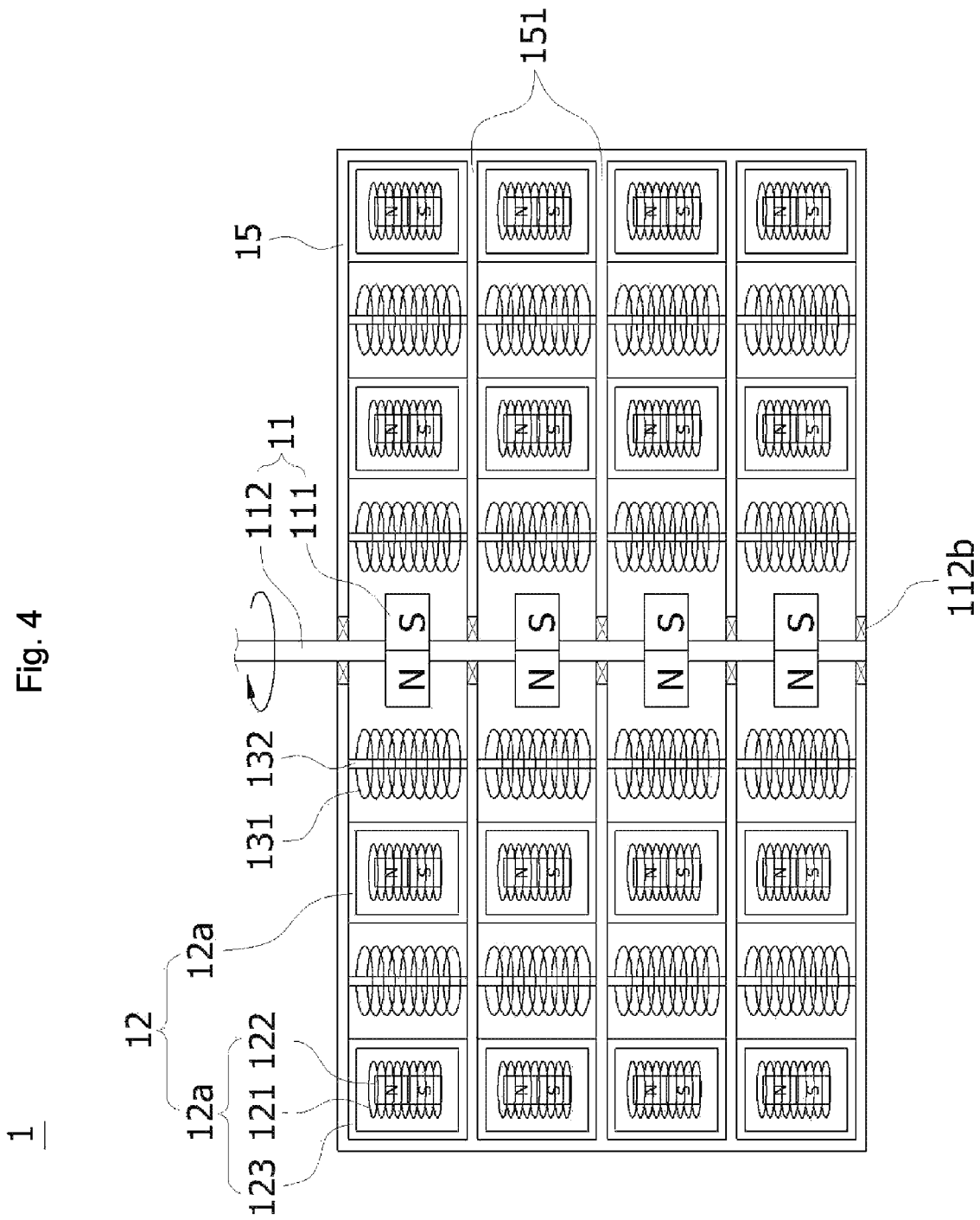
FIG. 4 is a construction view showing of the first preferred embodiment of the independent power generator assembly according to the first embodiment of the present invention.

FIG. 4 is a construction view showing of the first preferred embodiment of the independent power generator assembly according to the first embodiment of the present invention. FIG. 4 shows roughly a schematic longitudinal cross-sectional view.

As shown in FIG. 4, an independent power generator assembly 1 according to the first embodiment of the present invention is implemented to generate a large amount of power when the rotation force or the pressurizing force applied to the driving magnetic member 11 is large. According this, units including plural first and second power generation modules 12 and 13 are stacked repeatedly toward the upper portion or the lower portion.

In the driving magnetic member 11, plural permanent magnet coupling members 11 are constructed to a driving member 112, corresponding to the arrangement number of units comprising plural first and second power generation modules 12 and 13. At this time, N pole and S pole magnetized to the permanent magnet coupling member 111 are arranged toward the circumferential direction, in case that the driving shaft 112a is rotated, and are arranged toward the up and down direction in case that the driving shaft 112a has a translational motion structure toward the up and down direction.

On the other hand, the independent power generator assembly 1 according to the first embodiment comprises a driving magnetic member 11, and an external case 15 for sealing and receiving the units of the first and second power generation modules 12 and 13. The shape and size of the external case 15 can be changed according to the diameter of the stacked first and second power generation modules 12 and 13 and their stacked number.

And, as shown in FIG. 3, the unit of the first and second power generation modules 12 and 13 can be embedded within the external case 15 as the shape of having the respective individual upper and lower cases 142 and 141, but without having the respective upper and lower cases, it can be installed to a seating member 115 which is formed by an integral structure or a separable structure in the inside of the external case 15.

As above, in such an independent power generator assembly 1 according to the first embodiment, when the driving shaft 112a is rotated, plural permanent magnet coupling members 111 are coupled and rotated with each other, so the electromotive force is produced at the first and second power generation modules 12 and 13 stacked as the multiple layer, thereby generating the high power electricity.

Figure 5:
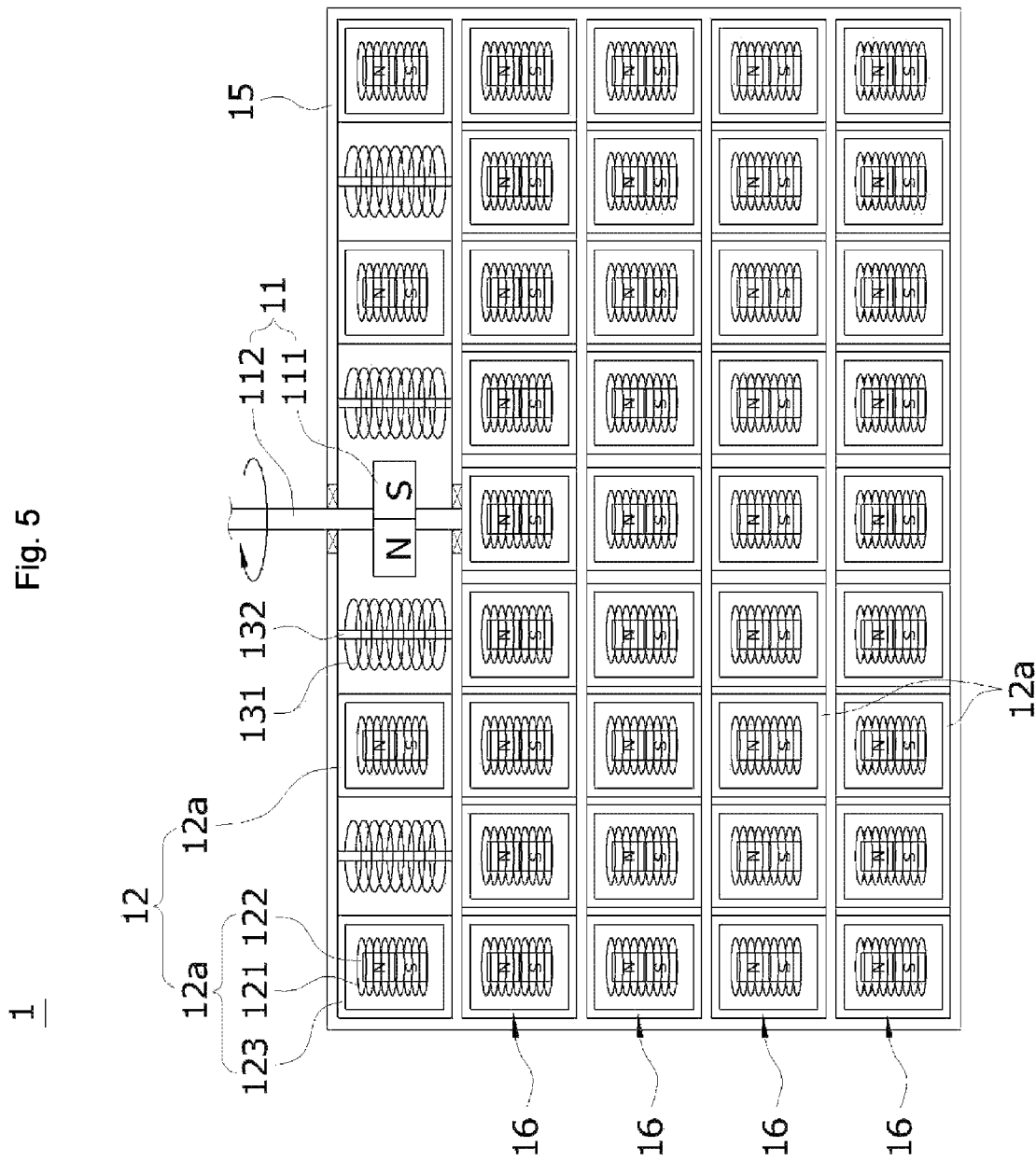
FIG. 5 is a construction view showing of the second preferred embodiment of the independent power generator assembly according to the first embodiment of the present invention.

FIG. 5 is a construction view showing of the second preferred embodiment of the independent power generator assembly according to the first embodiment of the present invention. FIG. 5 shows roughly a schematic longitudinal cross-sectional view.

As shown in FIG. 5, an independent power generator assembly 1 according to the second embodiment of the present invention is implemented to generate a large amount of power when the rotation force or the pressurizing force applied to the driving magnetic member 11 is large. According this, the assembly 1 comprises the third power generation module 16 in which units including plural first and second power generation modules 12 and 13 are arranged repeatedly toward the upper portion or the lower portion.

In the third power generation module 16, plural power supply generating members 12a are arranged within the case.

It is desirable that the power supply generating member 12a has an annular ring shape corresponding to the power supply generating member 12a constructing the first power generation module 12 and so their structures form plural circles.

As above, in such an independent power generator assembly 1 according to the second embodiment of the present invention, when magnet vibrators 122 of the first power generation module 12 is rocked by the motion of the driving magnetic member 11 and N and S poles are changed, the magnet vibrator 122 of the first power generation module 12 rocks the magnet vibrator 122 of the power supply generating member 12a constructing the third power generation module 16, so that the power supply generating member 12a of the third power generating module 16 generates the electricity also together with the power supply generating member 12a of the first power generation module 12.

And, in case that the third power generation modules 16 are arranged by the multiple layer, since the magnetic vibrator 11 of the upper power supply generating member 12a is rocked and then rocks the magnet vibrator of the lower power supply power generating member, plural power supply generating members 12a are operated by a driving magnetic member 11, as the manner similar to the domino effect, thereby generating high power electricity.

Hereinafter, a power generating system using independent power generator assemblies, which are illustrated in the previous first embodiment and another embodiments, will be described as follows.

Figure 6:
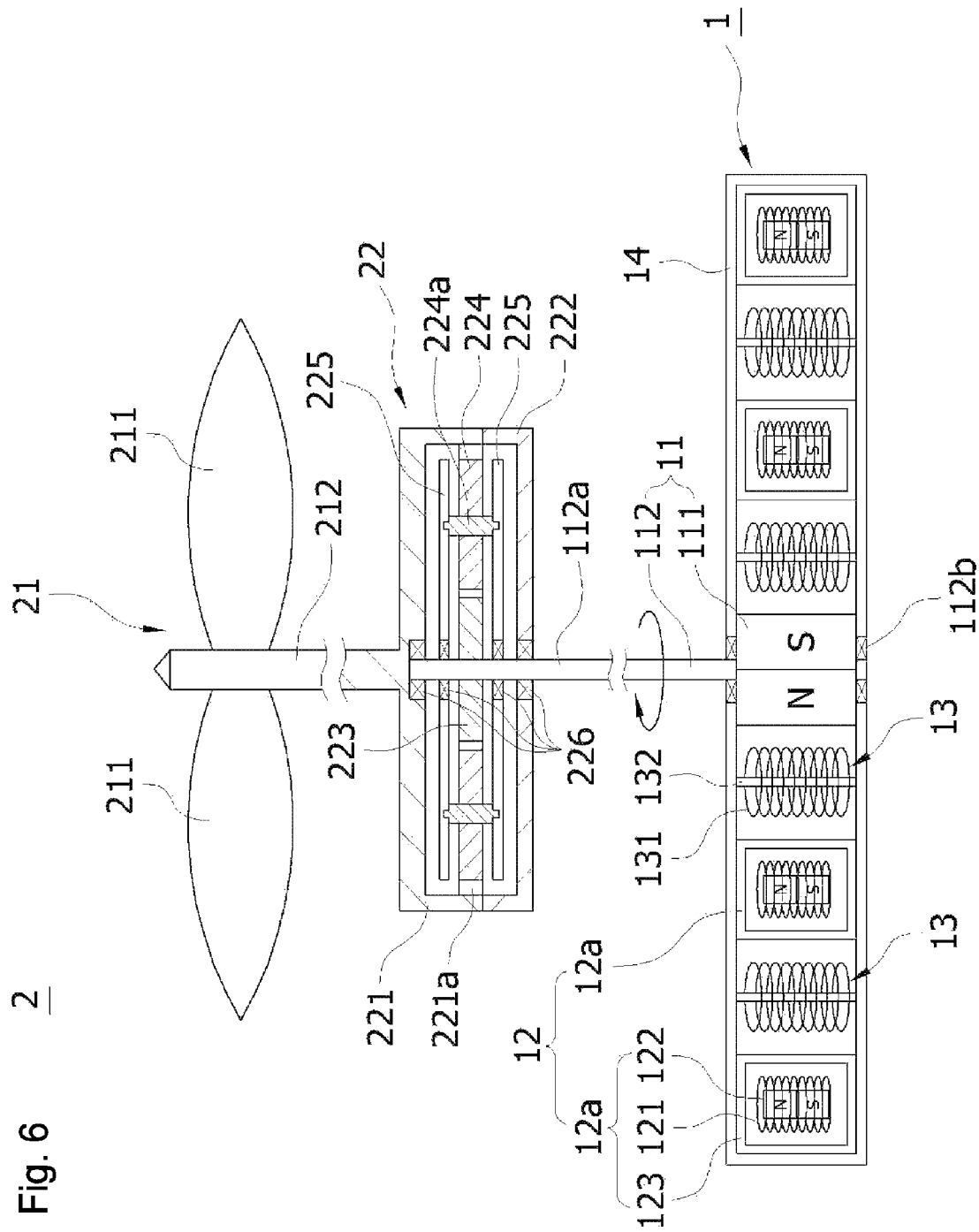
FIG. 6 is a construction view showing a power generating system using the independent power generator assembly according to the first embodiment of the present invention.

An accompanying drawing, FIG. 6 is a construction view showing a power generating system using the independent power generator assembly according to the first embodiment of the present invention.

A power generating system 2 using an independent power generator assembly comprises an independent power generator assembly 1 illustrated in the previous first embodiment and another embodiments, and an external force providing member 21 in which it provides a driving magnetic member 11 of the independent power generator assembly with a rotation force for performing a rotating motion or a transitional driving force for performing a transitional force.

Although the external force providing member 21 also can be constructed by the same structure as a pedal for providing a transitional driving force and so on, and the driving magnetic member 11 performs a transitional motion toward up and down direction, in this embodiment, as shown in FIG. 6, a driving shaft 112a is constructed as a driving member 112 of the driving magnetic member 11. This embodiment will be described with the external force providing member 21 as the center, which can be applied to a structure capable of generating electricity when the driving shaft 12a is rotated.

The external force providing member 21 is constructed by a rotation device having plural blades 211. The rotation device has a structure that a drag force type blade, which is efficient at the wind with low speed, is coupled with a rotation shaft 112, but may have a structure that lifting force, which is efficient at the wind with high speed, is coupled with a rotation shaft.

For example, a Darrieus type rotation device as a representative type to which a drag force type blade is applied or a Savonius type rotation device as a representative type to which a lifting force type blade is applied can be applied to the rotation device. Since such a rotation device is a conventional rotation device applied to a wind power generation and a water power generation, a concrete explanation will be omitted.

On the other hand, the power generation system 2 using the independent power generator assembly comprises a speed increasing device 22 for increasing the number of rotation of the driving shaft 112a, so that the efficient power generation can be performed also at the environment that the flow velocity or the wind velocity is low.

In the speed increasing device 22, although a rotation shaft 212 is rotated at low speed, the speed of a driving magnetic member 11 is increased and then rotated at high speed. Various speed increasing devices for increasing speed can be applied to wind power and water power and so on.

For example, the speed increasing device 22, as shown in FIG. 6, can be implemented in simple with a manner to which a planet gear is applied. That is, the speed increasing device comprises an upper housing 221 which is coupled with a lower end of a rotation shaft 212 of the external force providing member 21 and has an input gear portion 221a formed at its inner circumference, a lower housing 222 arranged at the lower side of the upper housing 221, a sun gear 223 formed at the driving shaft 112a to be positioned it at the inner portion between the upper housing 221 and the lower housing 222, plural planet gears 224 arranged between the sun gear 223 and the input gear portion 221a and installed rotatably by a center pin 224a, a support plate 225 for supporting rotatably the planet gear 224, and a bearing 226 or busing and so on for supporting and guiding the rotation motion of the previously construction elements.

As previously described, in the speed increasing device 22, when a rotation shaft 212 is rotated by the external force applied to the blade 211 and then an input gear portion 221a with a large diameter is rotated with one revolution, since the speed increasing operation is performed by gear ratio in the transmission process of the rotation force toward the planet gear 224 and the sun gear 112a, the driving shaft 112a has al number of revolutions and so is rotated with high speed.

Figure 7:
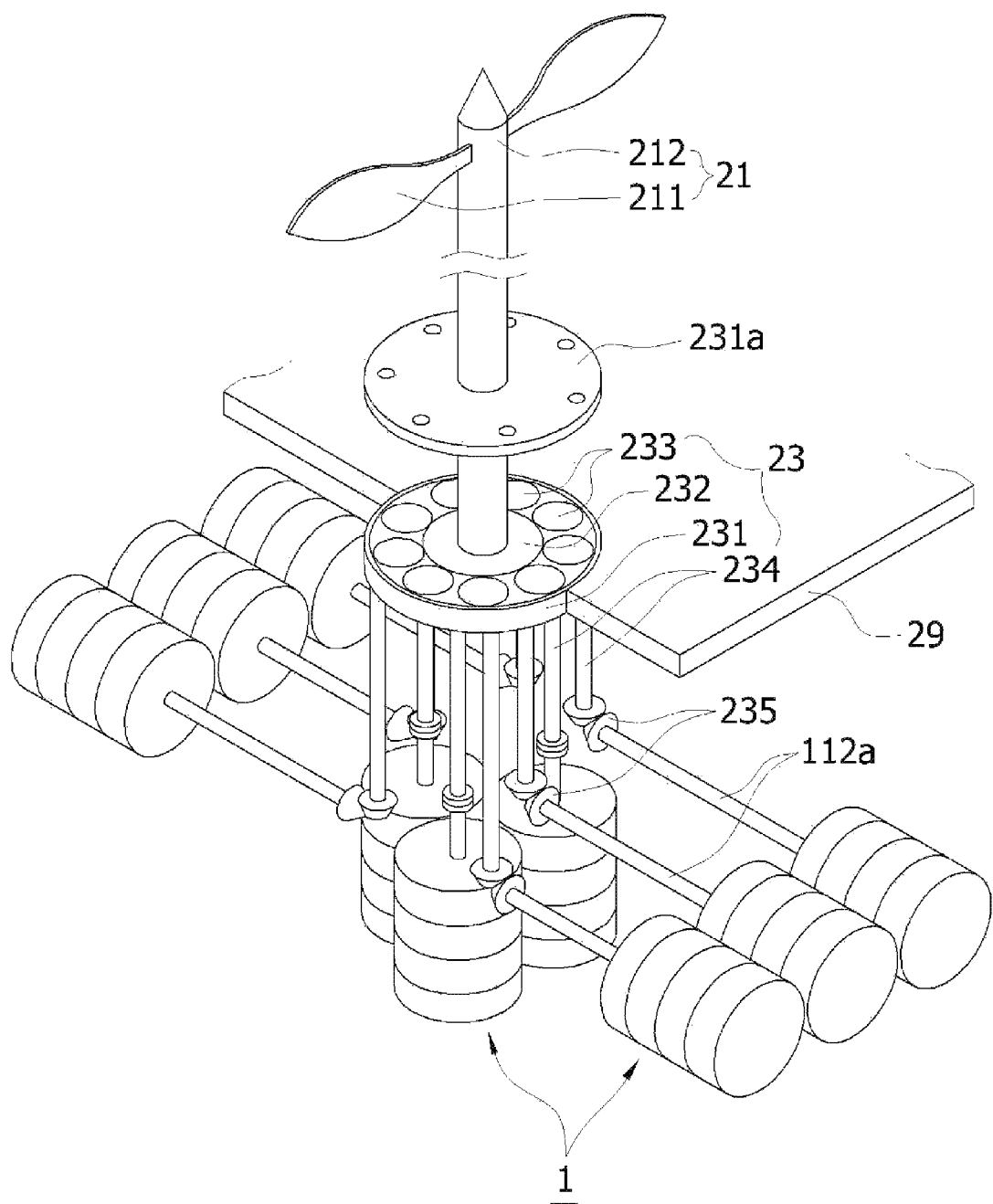
FIG. 7 is a construction view showing a power generating system using the independent power generator assembly according to the second embodiment of the present invention.

The accompanying drawing, FIG. 7 is a construction view showing a power generating system using the independent power generator assembly according to the second embodiment of the present invention.

The power generation system 2a using the independent power generator assembly according to the second embodiment comprises plural independent power generator assembly 1, and an external force providing member 21 for providing a rotation force for performing a rotation motion to a driving magnetic member 11 of the independent power generator assembly 1. Also, to generate more electricity, as shown in FIGS. 4 and 5, independent power generator assemblies in which units of the first and second power generation modules 12 are constructed as a multiple layer are arranged toward horizontal direction, vertical direction, or diagonal direction, and an electric power distribution transmitting member 23 is equipped to be transmitted a rotation force to the respective independent power generator assemblies 1.

The electric power distribution transmitting member 23 can be constructed by various gear coupling members in which a rotation force applied from one input shaft is increased and outputted to several output shafts. For example, as shown in FIG. 7, the electric power distribution transmitting member comprises a distribution box 231 installed to a member for installing 29 (a frame or a building and so on) and having a receiving space to the inside thereof, a driving gear 232 coupled with a lower end of a rotation shaft 212 of a rotation device, supported to the inner center of a distribution box 231 by a bearing (not shown) and so on, and installed rotatably, plural driven gears 233 installed rotatably within the distribution box 231 to be located it to the circumference of the driving gear 232, geared to the driving gear and rotated, and plural transmission shaft 234 in which its one end is coupled to the driven gear 233 and rotated and its other end is coupled to the driving shaft 112a to transmit a rotation force. At this time, the driven gear 233 comprises small gears with a small diameter to have plural number of revolutions to one revolution of the driving gear 233, thereby being performed the speed increasing operation.

And, plural independent power generator assemblies 1 are arranged toward vertical direction (a type that the driving shaft is located toward horizontal direction) and diagonal direction (a type that the driving shaft is located and arranged toward diagonal direction), so the transmission shaft 234 and the driving shaft 112a are coupled with each other so that electric power of a bevel gear is transmitted and the rotation force can be transmitted to the respective independent power generator assemblies 1.

Besides, the electric power distribution transmitting member 23 also can be implemented by a belt electric power transmitting type, which is not described in detail. For example, in an electric power distribution transmitting member 23 of the belt electric power transmitting type, plural driving gears (not shown) formed by timing gears are arranged and coupled to a rotation shaft 212 of an external force providing member 21, and plural driven gears (not shown) formed by timing gears are arranged distantly and on the other hand, the driving gear and the driven gear can be coupled with each other by a timing belt (not shown).

Figure 8:
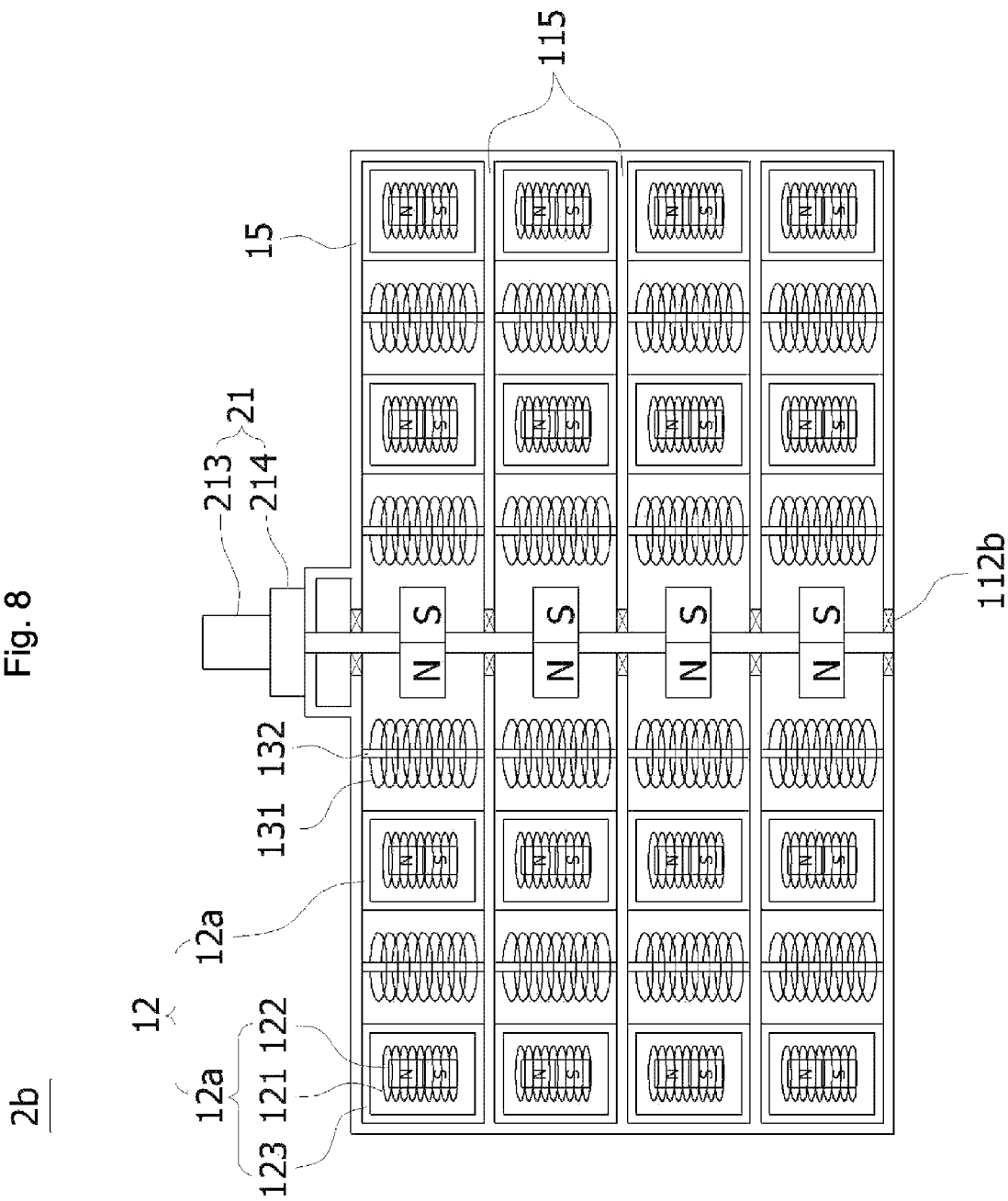
FIG. 8 is a construction view showing a power generating system using the independent power generator assembly according to the third embodiment of the present invention.

FIG. 8 is a construction view showing a power generating system using the independent power generator assembly according to the third embodiment of the present invention.

A power generation system 2b using an independent power generator assembly according to the third embodiment comprises plural independent power generator assemblies 1, and an external force providing member 21 for providing the rotation force for performing the rotation motion to a driving magnetic member 11 of the independent power generator assembly 1. The external force providing member 21 includes a motor 213 having a speed increasing member 214 for applying the rotation force to the driving shaft 112a of the driving magnetic member 11.

To the speed increasing member, various types of speed increasing members 214 which are applied for increasing speed can be applied to wind power generation or water power generation. In case that the rotation force of a motor 213 outputted to a motor shaft is passed through the speed increasing member 214, the speed is increased, the driving magnetic member 11 is rotated with high speed, and the power generation operation with high efficiency is performed at plural independent power generator assemblies 1.

In the power generation system 2b using the independent power generator assembly according to the third embodiment, there is an effective value when the power generation electric energy outputted from the independent power generator assembly 1 is much more than the electric energy applied from a motor. For this, the plural independent power generator assemblies must be arranged properly with the multiple stage.

FIGS. 9 and 10 are construction views showing power generating systems using the independent power generator assemblies according to the fourth and fifth embodiments of the present invention. FIGS. 9 and 10 show roughly schematic longitudinal cross-sectional views.

The power generation system using independent power generator assemblies according to the fourth and fifth embodiments comprises plural independent power generator assemblies 1, and an external force providing member 21 constructed at the circumference for providing a rotation force in which the first and second power generation modules 12 and 13 are rotated with the driving magnetic member 11 as a standard. In the power generation system according to the present embodiment, the external force providing member 21 is not constructed for driving the driving magnetic member 11, but constructed for rotating the first and second power generation modules 12 and 13. This is a difference to the first to third embodiments.

First, as shown in FIG. 9, the power generation system 2c using the independent power generator assembly according to the fourth embodiment comprises a driving magnetic member 11, plural first and second power generation modules 12 and 13 arranged with an annular ring, an independent power generator assembly 1 having a case 14 in which the first and second power generation modules are embedded, and an external force providing member 21 for rotating the case 14 including the first and second power generation modules. The external force providing member 21 is formed as a rolling wheel 215 at the outer circumferential surface of the case 14.

The rolling wheel 215 is a type similar to a conventional tire forming a wheel. The present power generation system can be applied as a rotation body of a vehicle having a transportation member such as a truck and so on, two-wheel, three-wheel, and four-wheel and so on.

As such, if the power generation system 2c using the independent power generator assembly according to the fourth embodiment is applied as a transportation member or a rotation body of a vehicle, at the rolling moving process, a case 14 including the first and second power generation modules is rotated and so the electromotive force is generated to the first and second power generation modules 12 and 13 by the electromagnetic induction, thereby capable of generating electricity without rotation of a driving shaft 112a. Such a type of power generation system performs a rolling operation in itself and independent power generation, and if it is applied to use for generating electricity by using surplus energy of various devices or products which perform rotation action or move through the rotation action, its degree of application is very high.

As shown in FIG. 10, the power generation system 2d using the independent power generator assembly according to the fifth embodiment comprises a driving magnetic member 11, plural first and second power generation modules 12 and 13 arranged with an annular ring, an independent power generator assembly 1 having a case 14 in which the first and second power generation modules are embedded, and an external force providing member 21 for rotating the case 14. The external force providing member 21 is constructed by plural blades 216 installed along the outer circumference of the case 14.

Blades 216 can be arranged and constructed by a drag force type blade, a lifting type blade, or a mixing type blade with the drag force type blade and the lifting type blade.

As such, the power generation system 2c using the independent power generator assembly according to the fifth embodiment has a structure with a blade 216 for capable of producing the rotation force against the flow of fluid and so it can be applied to wind power generation and water power generation.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

INDUSTRIAL APPLICABILITY

As described above, the independent power generator assemblies and power generation systems using the same according to the present invention are compact and simple, and can increase the arrangement number of power generation devices within a determined space, thereby maximizing the power generation amount of electricity. Also, they can be arranged within a limited space as multiple layer and multiple row, and can be applied to the wind power and water power generation system and so on, which has high power generation efficiency and compact and simple structures.

What is claimed is:

1. An independent power generator assembly comprising:
   a driving magnetic member in which N pole and S pole are arranged alternately and at the center thereof;
   a first power generation module including an induction coil in which electromotive force is produced by electromagnetic induction, and plural power supply generating members having isolation spaces with the driving magnetic member as the center, and arranged and constructed along the circumference of the driving magnetic member, the power supply generating member having a magnet vibrator in which it is rocked by the applied magnetic force and its magnetic poles are changed; and
   a second power generation module arranged along the isolation spaces and having induction coils;
   wherein the first power generation module and the second power generation module are repeatedly arranged with an annular ring shape: another first power generation module is arranged at the circumference of the second power generation module and another second power generation module is arranged at the circumference of such an another first power generation module.

2. The independent power generator assembly of claim 1, wherein the driving magnetic member comprises a permanent magnet coupling member having N poles and S poles repeatedly arranged toward the circumferential direction or up and down direction, a driving member with which the permanent magnet coupling member is coupled and for performing a rotation motion or a translational motion by driving force applied from the outside, and a case for sealing and receiving the magnetic member, the first power generation module and second power generation module.

3. The independent power generator assembly of claim 2, wherein the power supply generating member is formed by a structure which the induction coil is wound to a barrel-shaped body having a hollow portion and the magnetic vibrator is installed at the inside thereof, and the second power generation module has a structure that the induction coils are wound to a ring shape of winding housings arranged to the inside of the isolation spaces.

4. The independent power generator assembly of claim 2, further comprising a third power generation modules arranged repeatedly, selectively, and successively at upper and lower sides of the independent power generator assembly; the third power generation modules in which the plural power supply generating members are arranged repeatedly in a subsidiary case.

5. The independent power generator assembly of claim 2, wherein the plural independent power generator assemblies are arranged repeatedly toward upper side or lower side and the plural permanent magnet coupling members are located at the center of the respective independent power generator assemblies.

6. The independent power generator assembly of claim 2, wherein the driving member is constructed by a driving shaft formed by a rod type structure; the driving shaft capable of being a rotation motion or a translational motion.

7. The independent power generator assembly of claim 6, wherein the driving shaft is supported by a support bearing or busing.

8. A power generator system using an independent power generator assembly comprising: an independent power generator assembly according to claim 6; and an external force providing member constructed for providing a rotation force for performing a rotation motion or a translational force for performing a translation motion to the driving shaft.

9. The power generator system of claim 8, wherein the external force providing member is a rotation device having plural blades.

10. The power generator system of claim 9, wherein a speed increasing member for increasing the number of revolutions is constructed to the driving shaft.

11. The power generator system of claim 8, wherein plural independent power generator assemblies are arranged and an electric power distribution transmitting member is equipped, so that the rotation force applied from the external force providing member is transmitted to the respective independent power generator assemblies.

12. The power generator system of claim 11, wherein the electric power distribution transmitting member comprises a driving gear coupled with a lower end of a rotation shaft of a rotation device; plural driven gears for receiving the rotation force of the driving gear; and plural transmission shafts rotated by coupling with the driven gears and coupled with the driving shaft for transmitting the rotation force.

13. The power generator system of claim 12, wherein a part among the independent power generator assemblies are arranged by a stack type toward vertical direction or diagonal direction, and the transmission shaft and driving shaft are coupled with each other so that electric power is transmitted by a bevel gear.

14. The power generator system of claim 12, wherein the driving gear and driven gear are coupled by a timing belt.

15. The power generator system of claim 8, wherein the external force providing member is a motor having a speed increasing member for applying rotation force to the driving shaft.

16. The power generator system comprising: an independent power generator assembly of claim 1; and an external force providing member is constructed at the circumference for providing a rotation force, so that the first and second power generation modules are rotated with the driving magnetic member as a standard.

17. The power generator system of claim 16, wherein the external force providing member is plural blades or rolling wheels installed along the outer circumference.

* * * * *